United States Patent [19]

King, Jr. et al.

[11] Patent Number: 5,113,037

[45] Date of Patent: * May 12, 1992

[54] WATERPROOF WIRE CONNECTOR

[75] Inventors: Lloyd H. King, Jr., Town & Country; Thomas A. King, Chesterfield, both of Mo.

[73] Assignee: King Technology of Missouri, Inc., St. Louis, Mo.

[*] Notice: The portion of the term of this patent subsequent to Jun. 11, 2008 has been disclaimed.

[21] Appl. No.: 574,808

[22] Filed: Aug. 30, 1990

Related U.S. Application Data

[63] Continuation-in-part of Ser. No. 450,156, Dec. 13, 1989, abandoned, and a continuation-in-part of Ser. No. 478,687, Feb. 12, 1990, Pat. No. 5,023,402.

[51] Int. Cl.⁵ .................. H01R 4/22; H01R 43/00
[52] U.S. Cl. ........................ 174/87; 29/872; 439/447; 439/449; 439/456
[58] Field of Search .......... 174/87, 84 C, 76, 93; 29/868, 872; 439/447, 449, 452, 456

[56] References Cited

U.S. PATENT DOCUMENTS

| | | | |
|---|---|---|---|
| D. 191,399 | 9/1961 | Leach | D26/1 |
| 1,297,614 | 3/1919 | Van Viersen | 174/87 |
| 1,923,073 | 8/1933 | Brell | 174/87 |
| 2,416,943 | 3/1947 | Nicolazzo | 174/87 |
| 2,825,750 | 3/1958 | Stockwell | 174/87 |
| 2,870,239 | 1/1959 | Ustin | 174/87 |
| 2,877,288 | 3/1959 | Wayne | 174/92 |
| 2,932,685 | 4/1960 | Raila et al. | 174/87 |
| 2,939,805 | 7/1960 | Johnson | 411/258 |
| 2,958,723 | 11/1960 | Logan et al. | 174/93 |
| 3,012,219 | 12/1961 | Levin et al. | 439/402 |
| 3,061,455 | 10/1962 | Anthony | 427/409 |
| 3,083,260 | 3/1963 | Bird | 174/87 |
| 3,109,051 | 10/1963 | Vogel | 174/87 |
| 3,388,370 | 6/1968 | Elm | 439/402 |
| 3,483,310 | 12/1969 | Krup | 174/87 |
| 3,497,607 | 2/1970 | Swanson | 174/87 |
| 3,550,765 | 12/1970 | Anderson | 174/87 X |
| 3,558,800 | 1/1971 | Wallis et al. | 174/87 |
| 3,576,518 | 4/1971 | Bazille, Jr. | 439/402 |
| 3,597,528 | 8/1971 | Penfield et al. | 174/87 |
| 3,656,088 | 4/1972 | Seim | 439/402 |
| 3,746,068 | 7/1973 | Deckert | 151/14.5 |
| 3,783,177 | 1/1974 | Kelso | 174/87 |
| 3,793,611 | 2/1974 | Johansson | 439/399 |
| 3,793,612 | 2/1974 | Driscoll | 439/402 |
| 3,858,157 | 12/1974 | Bazille, Jr. | 439/400 |
| 3,869,190 | 3/1975 | Bazille, Jr. | 439/400 |
| 3,875,324 | 4/1975 | Waddington et al. | 174/87 |

(List continued on next page.)

FOREIGN PATENT DOCUMENTS

| | | |
|---|---|---|
| 0108518 | 8/1985 | European Pat. Off. . |
| 0267045 | 3/1990 | European Pat. Off. . |
| 0107601 | 10/1943 | Netherlands . |
| 56183 | 4/1944 | Netherlands . |

OTHER PUBLICATIONS

Brochure, GE Silicones; Compound Selector Guide; General Electric Company, Waterford, N.Y. 12188; Jul. 1990.

Brochure: King "One-Step"; 305 Direct Bury Waterproof Wire Connector; 1991.

Scotchlok Connector AD Sheet (no date).

Primary Examiner—Morris H. Nimmo
Attorney, Agent, or Firm—Jacobson & Johnson

[57] ABSTRACT

A waterproof and fire retardant connector having a rotatable wire connector with an end cap attached thereto with the wire connector filled with a sealant to permit the user to simultaneously compress the junctions ends of electrical wires into low resistance electrical contact while forming a waterproof covering and spark inhibiting compound surrounding the twisted junction end of the wires. The process includes inserting the junction ends of electrical leads into a wire connector, which is filled with a waterproof and fire retardant sealant, and then either crimping or rotating the wire connector to simultaneously form an electrical connection and waterproof and spark inhibiting seal around the twisted junction ends of the wires.

12 Claims, 6 Drawing Sheets

U.S. PATENT DOCUMENTS

| | | | |
|---|---|---|---|
| 3,912,356 | 10/1975 | Johansson | 439/400 |
| 3,934,076 | 1/1976 | Smith | 174/87 |
| 3,937,870 | 2/1976 | Bumpstead et al. | 174/87 |
| 4,039,742 | 8/1977 | Smith | 174/87 |
| 4,053,704 | 10/1977 | Smith | 174/87 |
| 4,059,136 | 11/1977 | Wallace | 151/14.5 |
| 4,081,012 | 3/1978 | Wallace | 151/14.5 |
| 4,107,453 | 8/1978 | Erixon | 174/87 |
| 4,295,004 | 10/1981 | Dauser, Jr. | 174/87 |
| 4,314,094 | 2/1982 | Smith | 174/87 X |
| 4,446,332 | 5/1984 | Dauser, Jr. | 174/87 |
| 4,491,686 | 1/1985 | Caviar | 174/87 |
| 4,691,079 | 9/1987 | Blaha | 174/87 |
| 4,751,350 | 6/1988 | Eaton | 174/87 |
| 4,803,779 | 2/1989 | Blaha | 29/878 |
| 5,023,402 | 6/1991 | King, Jr. et al. | 174/87 |

WATERPROOF WIRE CONNECTOR

CROSS REFERENCE TO RELATED APPLICATIONS

This application is a continuation-in-part of our patent application Ser. No. 450,156 filed Dec. 13, 1989, titled Waterproof Wire Connectors, now abandoned and a continuation-in-part of our patent application Ser. No. 478,687 filed Feb. 12, 1990 titled Waterproof Wire Connectors, now U.S. Pat. No. 5,023,402.

FIELD OF THE INVENTION

This invention relates generally to waterproof and fire retardant connectors and, more specifically, to waterproof wire connectors that can in one operation permit the user to simultaneously compress the junction ends of electrical wires into low resistance electrical contact while forming a waterproof covering around the junction ends of the electrical wires.

BACKGROUND OF THE INVENTION

The concept of wire connectors for connecting the junction of two or more wires together by twisting a cap on the wires is old in the art. Wire connectors are well known in the art and generally comprise an outer housing with a tapered threaded interior to permit a user to insert wires into the tapered opening. Typical examples of prior art wire connectors are shown in U.S. Pat. Nos. 3,497,607; 3,875,324; and 4,691,079. To use a wire connector, the user inserts the twisted ends of electrical wires into a cavity on the inside of the wire connector. The user then holds the wire in one hand and with the other hand twists the wire connector. The twisting action pulls the junction ends of the wires into a low resistance electrical contact.

If the connector is located in a wet location it is necessary to place a waterproof sealant around the connector. In order to prevent water or moisture from entering the connector and forming an oxidation layer over the ends of the wire the user inserts the wire connector and the wire into some type of a waterproof potting compound. The compound may be either a non hardening or a hardening compound. In either case the compound creates a waterproof capsule over the wire connector and the junction ends of the electrical wires.

The prior art process is time consuming because it involves two separate steps as well as the nuisance of having separate potting compounds and containers to hold the potting compound. The present invention provides an improved wire connector that permits the user in one continuous action to simultaneously form the junction ends of wire leads into a low resistance electrical connection that is surrounded by a waterproof sealant to form a waterproof covering around the junction ends of the wire leads.

DESCRIPTION OF THE PRIOR ART

The Viersen U.S. Pat. No. 1,297,614 shows a process where twisted wire ends are potted in a solder.

The Nicolazzo U.S. Pat. No. 2,416,943 shows a wire connector that squeezes the ends of the wires between an outer housing and an inner housing.

The Bird U.S. Pat. No. 3,083,260 shows a cup shaped body that has a metal cement or putty located around the twisted ends of two electrical leads.

The Swanson U.S. Pat. No. 3,497,607 shows a wire connector that has a spring in the cavity of the connector that cuts through the insulation on the wires.

The Smith U.S. Pat. No. 4,039,742 shows a waterproof splice that uses an enclosed tube containing a sealant that covers the electrical connection between the wires.

The Erixon U.S. Pat. No. 4,107,453 shows a wire connector with an inner and an outer housing with the ends of the wires located between the inner and the outer housing. Twisting the outer housing while holding the inner housing twists the wires into electrical contact.

The Dauser U.S. Pat. Nos. 4,295,004 and 4,446,332 show a solderless wire connector where a cap is squeezed over the ends of the wires to provide an electrical connection.

The Eaton U.S. Pat. No. 4,751,350 shows a cap containing a sealant and retentions to engage the end of a wire inserted into the cap to provide a sealing device around the end of the wire.

The Ustin U.S. Pat. No. 2,870,239 shows a wire connector with a splice cap that is permanently crimped to the conductors to hold the conductors in mechanical and electrical contact.

The Vogel U.S. Pat. No. 3,109,051 shows an electrical wire connector that includes parallel spaced surfaces to insert the ends of the twisted wires in.

The Krup U.S. Pat. No. 3,483,310 shows a connector that has a sleeve that contracts to prevent the sleeve from being withdrawn from the connector.

The Anderson U.S. Pat. No. 3,550,765 shows a sleeve that contains a viscous or flowable substance such as an uncured cement that is hardened to hold the electrical leads in the connector.

The Waddington U.S. Pat. No. 3,875,324 shows a wire connector with a tapered spring located in the connector.

The Caviar U.S. Pat. No. 4,491,686 shows an electrical connector with coverings that can be pierced by inserting a sharply pointed object. A potting compound is then placed around the wires.

The U.S. Pat. No. 4,691,079 shows a screw on wire connector with a shell that is easier to manufacture.

The Netherlands Pat. No. 56183 shows a hook on the side of some type of a connector.

The Bumpsted U.S. Pat. No. 3,937,870 shows a connector including a potting cement to cement the wires in a solid mass.

The Penfield U.S. Pat. No. 3,597,528 shows an electrical wire connector with an insertable plastic plug that contains a plastic bonding agent.

The Smith U.S. Pat. No. 3,934,076 shows an electrical connector with a pre filled and premixed sealant for encapsulating the ends of the wires.

The Smith U.S. Pat. No. 4,314,094 shows a container for spliced cables.

The Smith U.S. Pat. No. 4,053,704 shows a key for forming an enclosure for two or more wire cables together.

SUMMARY OF THE INVENTION

Briefly, the present invention comprises an improvement to a wire connector by providing a wire connector with an end cap to hold a sealant in the wire connector. In one embodiment the user inserts the twisted wires through the end cap into the sealant in the wire connector. While holding the wires the user twists the wire connector to simultaneously form an electrical connection between the wires and to place a waterproof and spark inhibiting coating over the twisted electrical leads to produce a waterproof and fire retardant wire connector. In another embodiment the end cap comprises a sleeve rotatably mounted on the end of the wire connector with the sleeve containing a waterproof sealant to permit a user to insert the twisted junction ends of electrical leads into the wire connector by inserting the junction ends into the waterproof sealant located in the sleeve and the wire connector. The user then holds the wire and sleeve and rotates the wire connector to simultaneously form the junction ends of the electrical leads into a low resistance electrical connection protected by the waterproof sealant.

DESCRIPTION OF THE PREFERRED EMBODIMENT

Figure 1:
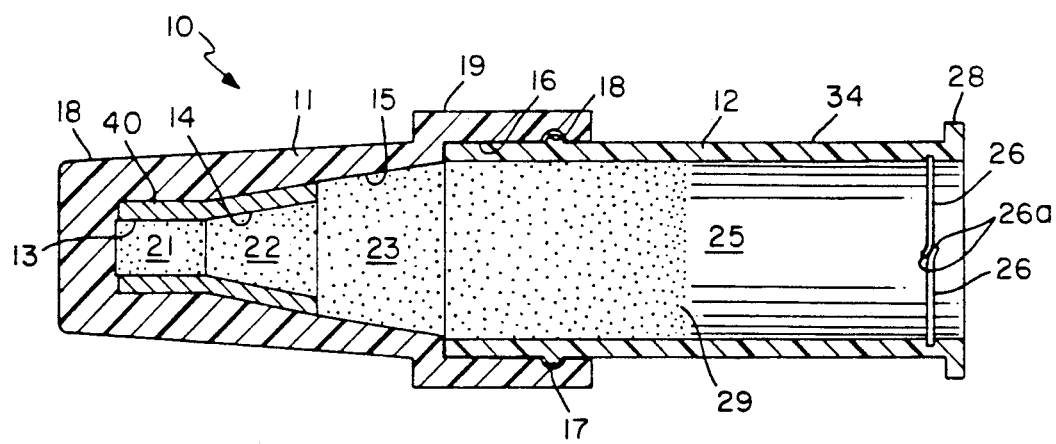
FIG. 1 shows a cross sectional view of our waterproof wire connector.

Referring to FIG. 1 reference numeral 10 generally identifies our waterproof and fire retardant wire connector for simultaneously forming a waterproof, spark inhibiting, low resistance electrical connection between the junction ends of electrical leads. Wire connector 10 includes a general cylindrical electrical insulated housing 11 having a cylindrical opening 16 for rotatively engaging an end cap comprising a closed end cylindrical tube or sleeve 12. Located on the closed end of housing 11 is an electrical conducting collar 40 having a first cylindrical interior surface 13 and a converging or tapered wire coil forming a spiral surface 14. The drawing shows collar 40 as a one-piece wire coil, however if desired collar 40 could be made in two pieces. Collar 40 is rigidly mounted in housing 11 so that one can twist housing 11 and collar 40 about the twisted ends of electrical leads to provide a low resistance electrical connection therebetween. Housing 11 is virtually identical to existing wire connectors except for a cylindrical surface 16 to rotatively support a sleeve 12 and an annular opening 18 located in the cylindrical surface 16 to prevent axial displacement of sleeve 12 in housing 18. While our connector is shown with an electrical conducting collar 40 having a wire coil forming a spiral surface in some applications the wire coil is replaced with a nonconducting collar having a surface for twisting on electrical leads.

Rotatively connected to the open end of housing 11 is cylindrical tube or sleeve 12. The cylindrical tube 12 has an exterior cylindrical surface 34 with an annular cylindrical retaining bead 17 extending radially outward from tube 12. Located on the interior cylindrical surface 16 of housing 11 is a cylindrical recess 18 that extends completely around surface 16. The bead 17 engages cylindrical recess 18 to prevent axial withdrawal of tube 12 from housing 11 but permits rotational movement of housing 11 with respect to sleeve 12. While bead 17 is shown as annular, bead 17 need only be sufficiently long so as to hold end cap 12 in rotatable position in wire connector 11. The cylindrical surface 34 engages a portion of cylindrical recess 16 in a close mating relationship that provides a tortuous path for escape of sealant. That is, the annular path between the two surfaces and the combination of a bead 17 and annular recess 18 effectively prevent the sealant from leaking out of my connector during storage and handling.

Waterproof and fire retardant connector 10 includes interior compartments 21, 22, 23, and 25 that are partially filled with a viscous sealant 29. Typically sealant 29 can be a silicone base material or the like, a potting compound, greases, or any other waterproofing and fire retardant compounds. A viscous sealant that remains in the connector due to its inherent non-flowability is preferred since the sealant will not run out when our waterproof wire connectors are stored for use or during use. However, other materials could also be used, for example potting compounds that set after exposure to the air. Typical of materials for use with our invention are waterproof and fire retardant greases, potting compounds, or the like.

Not only is the sealant useful in preventing the electrical leads from oxidation which results in a poor electrical connection, but it also helps to keep the wires from working loose in the wire connector. In addition, the sealant is also useful in inhibiting sparks that could ignite volatile gases and other flammable material since the sealant encapsulates the exposed portions of the electrical leads. Located on the end of tube 12 is a flexure cover that comprises a plurality of pie shaped resilient segments 26 that converge toward the pointed end 26a of the segments. (FIG. 5) The segments slightly overlap each other to form a closure to hold sealant 29 within connector 10 during the handling and transportation of our waterproof connectors. Prior to use the waterproof and fire retardant connectors are loosely stored in a box. With the end of the tube covered by the overlapping segments it prevents one from accidently getting the sealant onto other connectors. If one uses a waterproof sealant that sets when exposed to the air one could use a continuous foil instead of segments 26. With a foil one would pierce the foil with the end of the wires as the wire ends are inserted into the tube.

Figure 5:
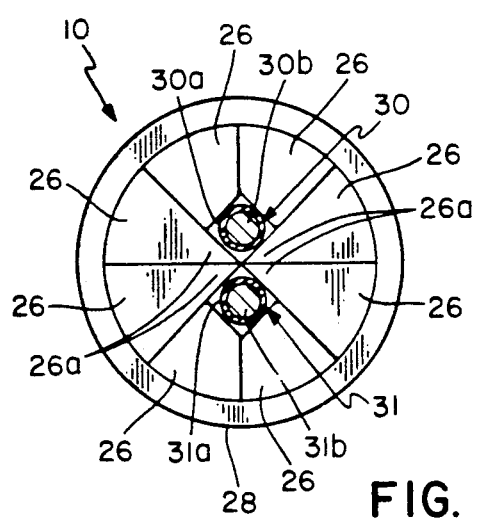
FIG. 5 is an end view of our waterproof and fire retardant connector taken along lines 5 of FIG. 4.

FIG. 5 shows how the segment ends 26a flex inward to permit the wires 30 and 31 to be inserted into our waterproof connector. Thus the segments permit a wire to be inserted therethrough while at the same time flexing into a position to close off and seal around the wires.

When one inserts a twisted wire pair into the cylindrical tube the resilient segments 26 flex inward around the wire to permit the wire to be inserted into the cylindrical cavity 21 while also providing a self forming opening that automatically conforms to the size and shape of the electrical wires. As FIG. 3 illustrates sealant 29 expands to fill the cavity as the wires are inserted into the connector and displace sealant 29.

Figure 2:
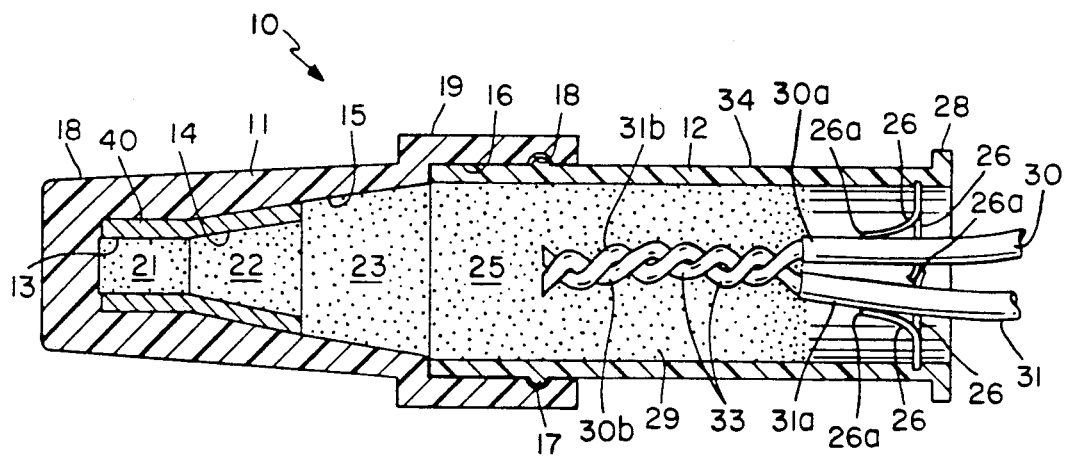
FIG. 2 shows a cross sectional view of our waterproof and fire retardant connector with the junction ends of two wire leads partially inserted into our connector.
Figure 3:
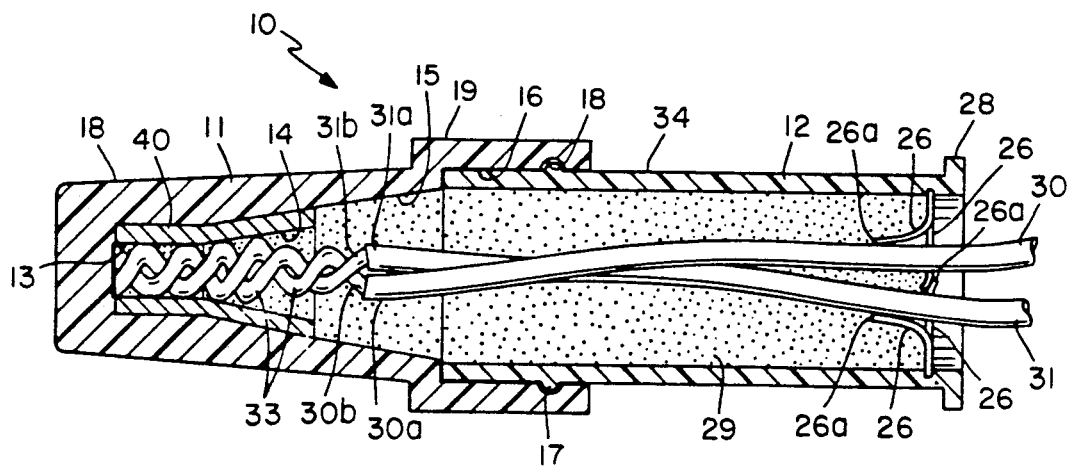
FIG. 3 shows a cross sectional view of our waterproof and fire retardant connector with the junction ends of two wire leads twisted into the cavity in the connector.
Figure 4:
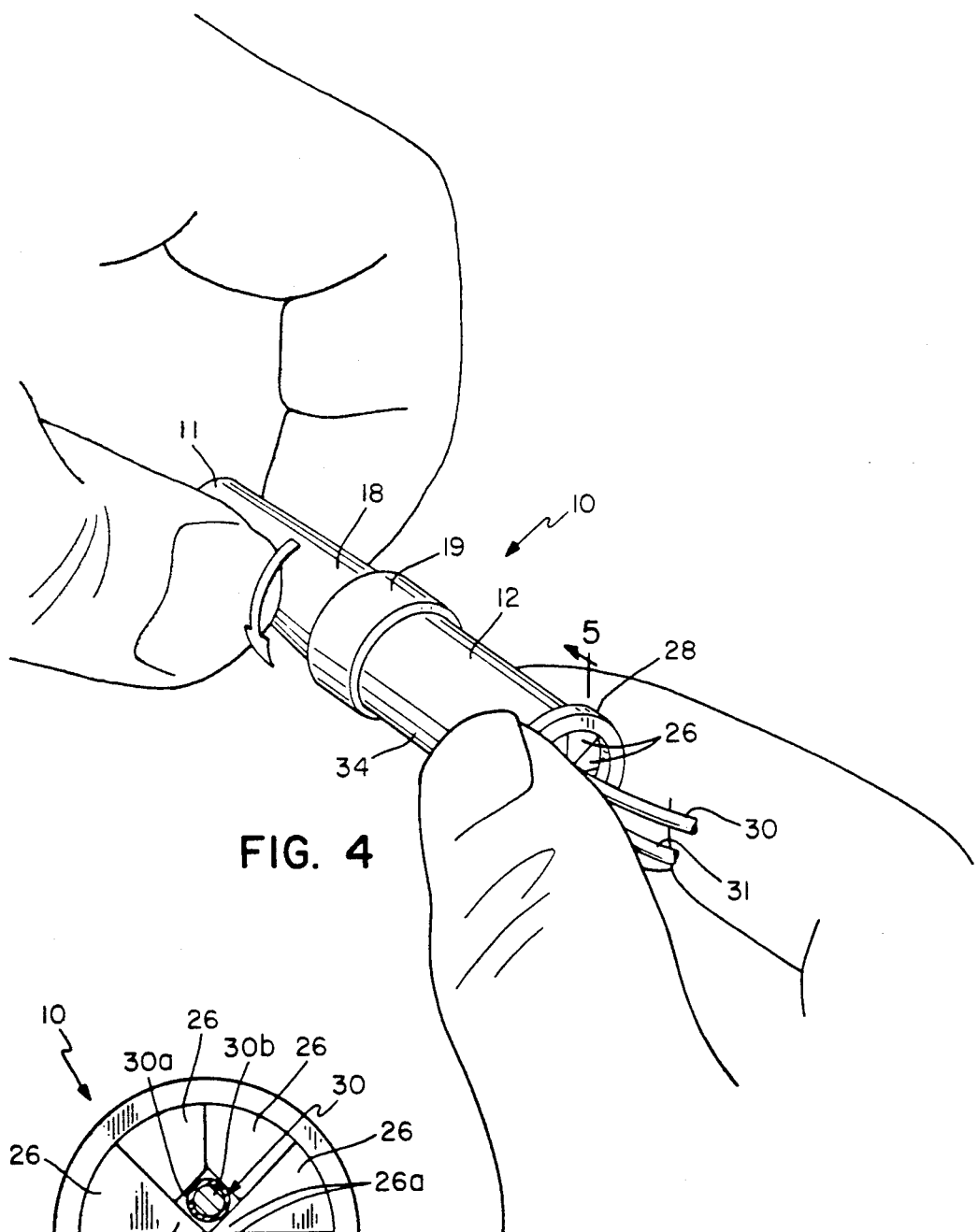
FIG. 4 shows a user rotating one end of our waterproof wire connector while holding the other end stationary.

In order to understand the operation of our invention reference should be made to FIG. 2, FIG. 3 and FIG. 4. FIG. 2 shows an installer inserting a twisted junction 33 formed from wires 30 and 31 into the sealant filled cavity 25. Wire 30 has an electrical insulating covering 30a surrounding a metal wire 30b. Similarly, wire 31 has an electrical insulating covering 31a surrounding metal wire 31b. FIG. 3 shows the wire junction inserted into the cavity 21 with the twisted wire junction 33 contacting the inside surface 13 of collar 40.

FIG. 4 illustrates how a user can simultaneously form a waterproof, spark inhibiting, low resistance electrical connection between the electrical leads with our waterproof connector. To simultaneously form the electrical connection and the waterproof and spark inhibiting covering the operator grasps wires 30 and 31 and the outside surface 34 of tube 12 in one hand and axially inserts the twisted ends of wires 30 and 31 into the chambers 21 and 22 of housing 11. Once the junction ends of the wires are inserted into chambers 21 and 22 the installer takes the other hand and grasps exterior surface 19 on housing 11. The installer then rotates housing 11 while holding the wires and the sleeve to firmly twist the wire junction 33 into contact with the metal collar 40. At the same time the viscous sealant 29 located in the interior cavities 21, 22, 23, and 25 forms a waterproof and spark inhibiting protective covering over junction end 33 of wires to make the connector both waterproof and fire retardant. The use of the sealant in conjunction with a twist on connector permits the installer to simultaneously connect and seal the junction in housing 11 to prevent water and moisture from entering housing 11 which could cause oxidation of the wires resulting in a poor electrical connection. Although the sealant is present in cavities 21 and 22 it has been found that the sealant does not prevent one from rotating housing 11 to twist the junction ends of electrical leads into a low resistance electrical connection.

In the embodiment of FIG. 1 we show sleeve 12 rotatively connected to wire connector 11. In certain embodiments one could fixedly connect sleeve 12 to wire connector 11. For example if the sealant was flowable it would flow around the wires as the sleeve is rotated about the wires. If the sealant is flowable one could use a flowable air hardened material such as an epoxy to form the waterproof covering over the twisted ends in the wire connector. In order to maintain the sealant within the rigid connector one can use segments with a spiral configuration that will flex laterally and inwardly around the wire as the wire connector is rotated. Another variation of my invention is to have the flexible segments that permit the end seal to rotate with respect to the sleeve. For example, flexure segments 26 could have an annular base region 28 that is rotatably mounted in an annular recess in sleeve 12.

Figure 6:
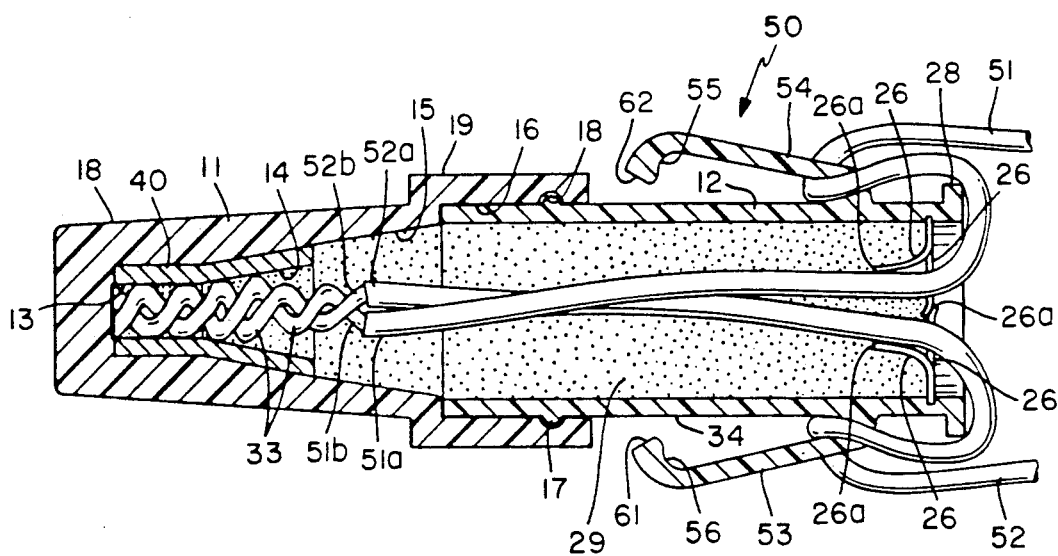
FIG. 6 shows a cross sectional view of another embodiment of our invention.

Referring to FIG. 6 an alternate embodiment of our invention is shown with reference numeral 50 identifying the invention. Connector 50 is identical to connector 10 except the connector 50 includes a first resilient wire clip 54 located on one side of housing 12 and an identical resilient wire clip 53 located on the opposite side of housing 12. Identical parts in FIG. 6 and FIGS. 1-5 and are identified with identical numbers. Resilient clip 54 compress a forward extending member that has a curved section 55 terminating in an end 62 that is slightly angled to permit sliding a wire between clip 55 and surface 34. Likewise clip 53 includes a curved surface 56 and an angled end 61.

FIG. 6 illustrates that wire 51 extends through opening in the end of sleeve 12 and around clip 54 and then back in the same direction. The purpose of clip 54 is to ensure that the wire 51 is not accidentally pulled out of wire connector 11 during handling of the wires. FIG. 6 also illustrates that wire 52 extends through opening in the end of sleeve 12 and around clip 53 and then back in the same direction. Likewise the purpose of clip 53 is to ensure that the wire 52 is not accidentally pulled out of wire connector 11 during the handling of the wires. While only two wires are shown in my invention one can use either of our inventions with either one wire or with multiple wires. Also although two clips are shown one clip is sufficient to hold two or more wires from accidentally being pulled out of housing 12.

Figure 8:
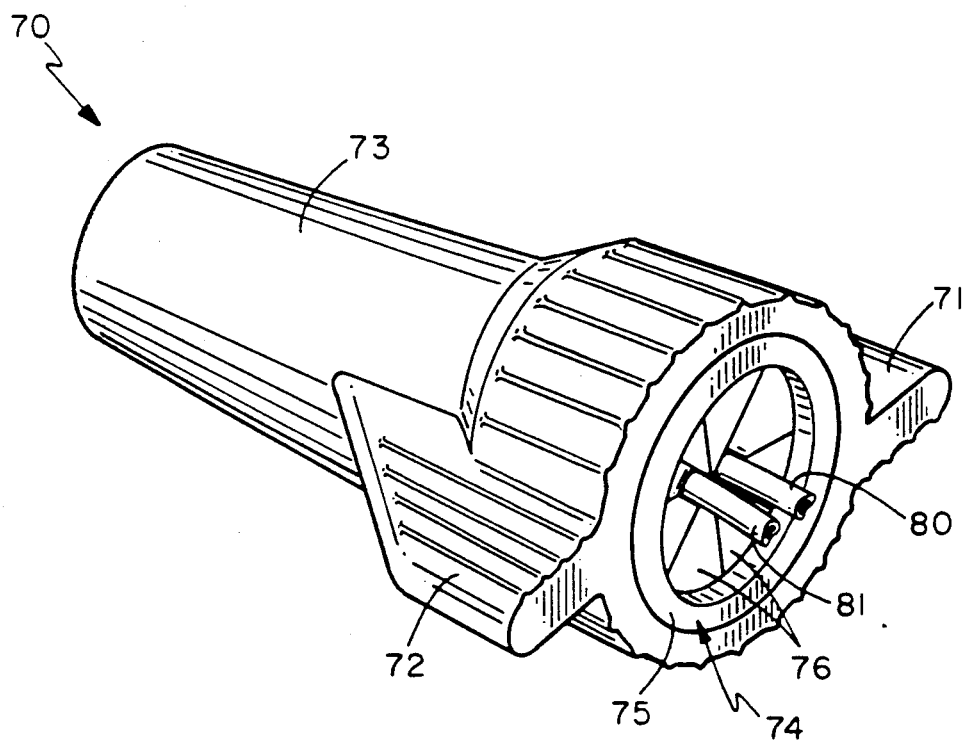
FIG. 8 shows a pictorial view of the wire connector of FIG. 7.

Referring to FIG. 8 reference numeral 70 identifies a conventional wire connector having a cylindrical tapered body or housing 73 with a first flange 71 and a second flange 72. Extending outward form wire connector 70 are a first wire 80 and a second wire 81. The purposes of the flanges are to provide better gripping surfaces to enable a user to twist a wire connector around a pair of twisted wires such as wires 80 and 81.

Figure 7:
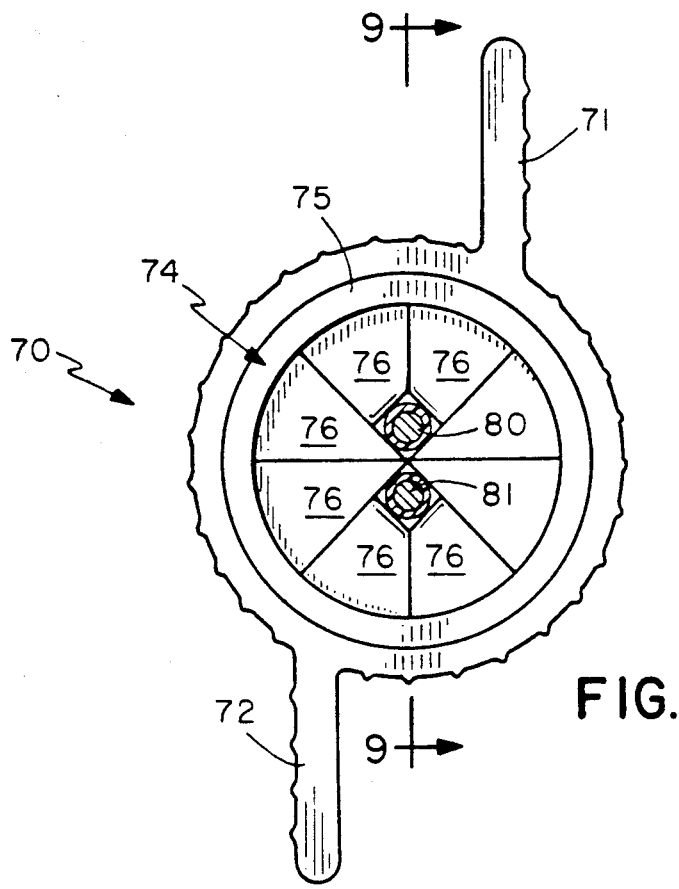
FIG. 7 shows an end view of an alternate embodiment of the invention.

FIG. 7 shows an end view of the wire connector 70 with the end cap comprising a cylindrical threaded insert 74 for holding the waterproof sealant within wire connector 70. End cap 74 comprises an outer support ring 75 with a plurality of flexible pie shaped segments 76 extending in an overlapping arrangement toward the center of the end cap 74 to provide a flexure cover closure to the end cap of wire connector 70.

Figure 11:
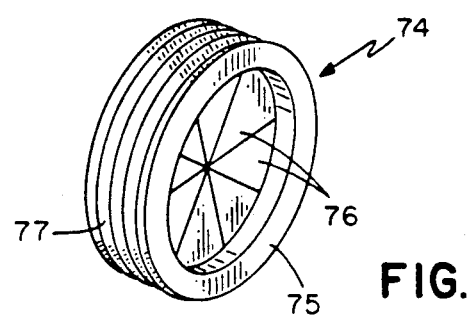
FIG. 11 shows a perspective view of the end cap of the wire connector of FIG. 9.

FIG. 11 shows end cap 74 in a pictorial view revealing annular support ring 77 containing male threads 77 for engaging with female threads located on the inside of a conventional wire connector. The flexible segments are identified by reference numeral 76.

Figure 9:
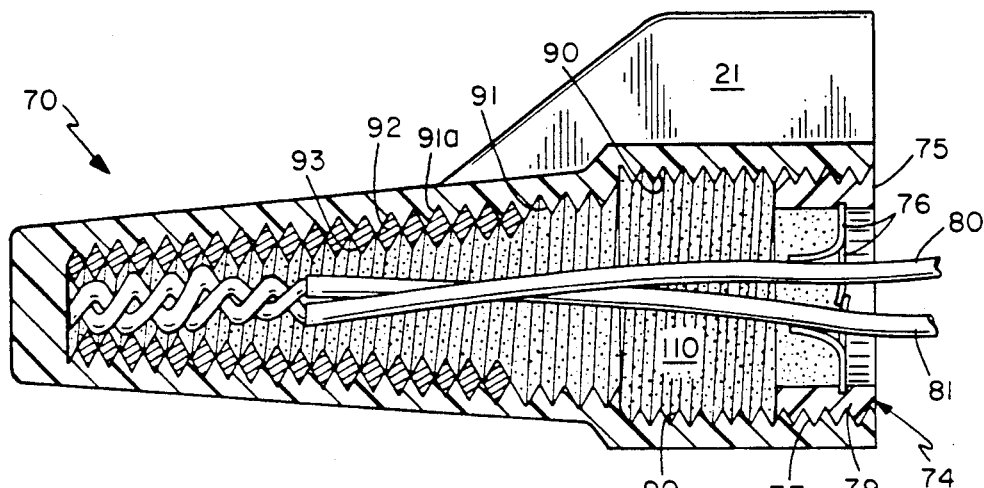
FIG. 9 shows a cross sectional view of the wire connector of FIG. 7 taken along lines A—A of FIG. 7.

FIG. 9 illustrates end cap 74 located in the end portion of wire connector 70. Wire connector 70 includes a first set of conical female threads 91 for engaging conical male threads 91a on the outside of a metal insert 92 and conical shaped female threads 93 on the inside for engaging electrical leads. Located in contact with insert 92 are the twisted ends of wires 80 and 81. Wires 80 and 81 extend through the flexible segments 76 which flex around the wires to form a barrier to prevent the sealant 110 in wire connector 70 from flowing out the end of the wire connector 70. Depending on the frictional resistance between female threads 90 and male threads 77, insert 74 may or may not rotate as the user twists the wire connector about the ends of electrical leads 80 and 81. In either case the resilient flexible segments retain the sealant in the connector.

The advantage of end cap 74 is that one can quickly convert a standard wire connector with an internal female thread into the present invention of a water resistant wire connector by merely screwing insert 74 into the female threads 90 located on the inside of wire connector 70. Alterantly one could make a longer wire nut to hold more sealant. If the resilient flexible segments 76 are sufficiently flexible one can hold wires 80 and 81 in one hand and rotate wire connector 70 about the wires. The resilient flexible segments 76 not only flex inward but also flex sideways as the wire connector 70 and end cap 74 are rotated about the stationary wires to hold the sealant in the wire connector as the wires are twisted into electrical contact with the metal insert 92 in wire connector 70. Typically, flexible segments can be made from a polymer plastic or the like.

Figure 10:
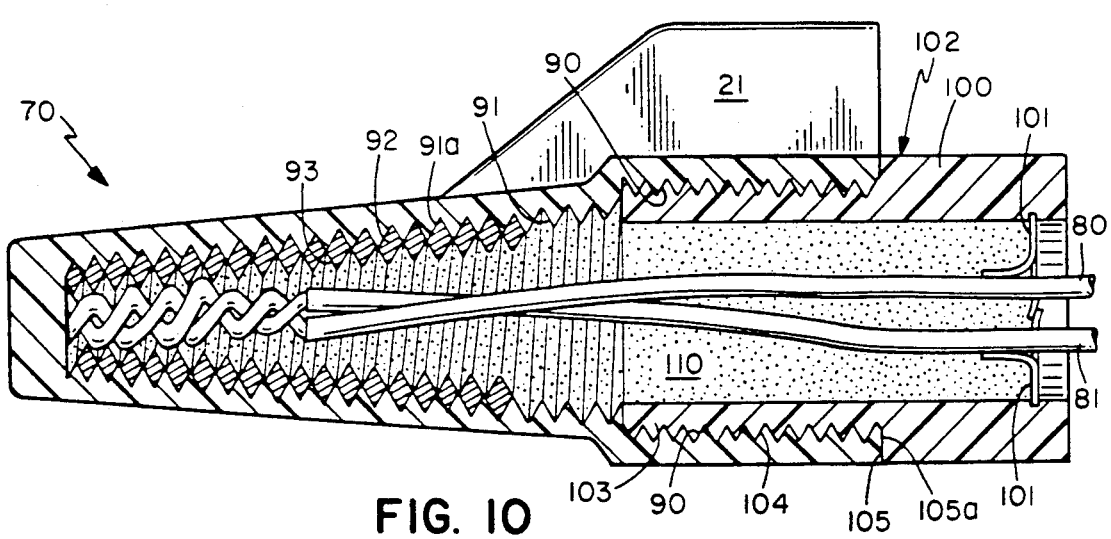
FIG. 10 shows a further alternate embodiment of an end cap in a wire connector.

FIG. 10 shows an alternate embodiment wherein the end cap comprises a non-rotateable insert 102 that contains an extended cylindrical section or sleeve 100 that projects outward beyond the end of wire connector 70. The advantage of wire connector connector of FIG. 10 is that more sealant 110 can be located in the wire connector sleeve 102. End cap 102 includes a first end 103 having male threads 104 for engaging the female threads 90 in wire connector 70. The end of wire connector 70 includes a shoulder 105 for abutting and securing connector 70 against an annular surface 105a on end cap 102. The advantage of the embodiment of FIG. 9 is that a conventional wire connector can be converted into a water proof connector with a reservoir of sealant for ensuring that the twisted bare ends of the electrical connections remain covered with the sealant. While end cap 74 is shown as being threaded into connector 70 other means of fastening such as adhesives or mechanical interlocks could be used to fasten the end cap to the connector to produce a compartment for holing a sealant.

Although end cap 74 is shown fitting on the interior of wire connector 70 end cap 74 could be adapted to include an external collar to perm the end cap to fasten to the exterior of the wire connector rather than the interior of the wire connector.

With both the embodiments of FIG. 7-11 it is apparent that one can readily adapt a wire connector containing female threads to a closed container for holding a viscous electrical waterproof material.

Figure 12:
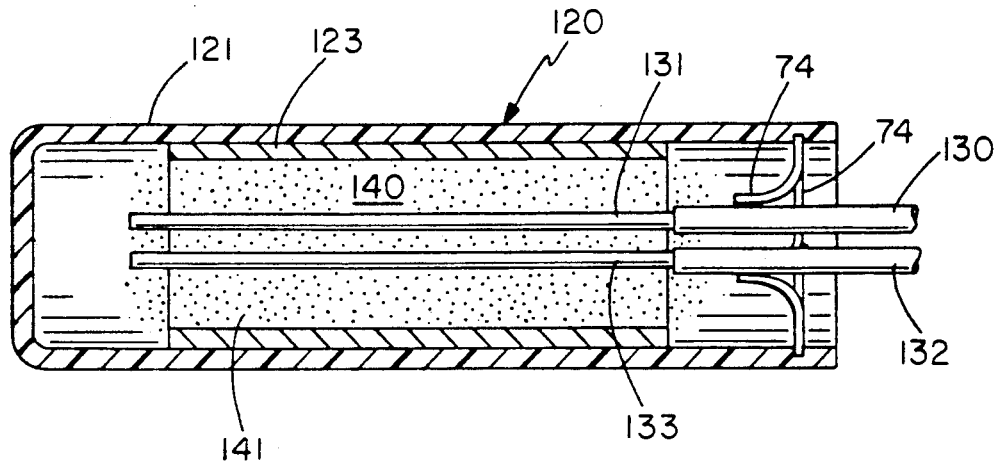
FIG. 12 shows a cross sectional view of an alternate embodiment of our invention.

Referring to FIG. 12 reference numeral 120 identifies an alternate embodiment of our wire connector invention that is used with a connector that a user crimps on to electrical leads to provide a low resistance electrical connection between the electrical leads. Wire connector 120 includes a flexible insulated exterior pocket shaped housing 120 having a cylindrical deformable metal collar mounted in the interior of wire connector 120. Located on the open end of connector 120 is previously described end cap 74. Extending through the flexure segments in end cap 74 is a first electrical lead 130 having an exposed section 131 for forming electrical contact with a conducting surface and a second; electrical lead 132 having an exposed section 133 for forming electrical contact with a conducting surface. Located on the interior of wire connector 120 is an interior chamber 140 containing a water resistant and spark inhibiting sealant 141 that partially fills compartment 140.

In operation of wire connector 120 an operator inserts end 131 of electrical lead 130 and end 133 of electrical lead 132 through the flexible segments in end cap 74. After inserting the leads into chamber 140 and into the interior of conducting collar 123 the user crimps the outside of wire connector 120 to collapse non-resilient electrical conducting collar 123 around leads 131 and 133.

Figure 13:
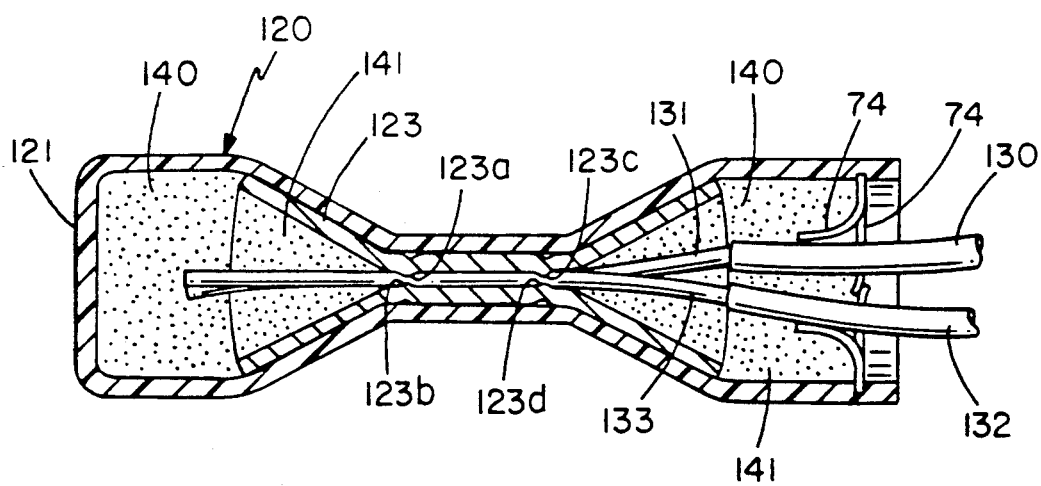
FIG. 13 shows the embodiment of FIG. 12 in the collapsed condition.

FIG. 13 illustrates connector 120 in the collapsed condition with deformable conducting collar 123 forming a low resistance electrical connection between leads 131 and 133. The crimping tool (not shown) produces oppositely disposed protuberances 123a and 123b and 123c and 123d that form low resistance electrical contact regions between wire leads 131 and collar 123 and wire lead 133 and collar 123.

Located around wire leads 131 and 133 is a waterproof and spark inhibiting sealant 141 such as silicone or the like. FIG. 13 shows that the sealant 141 has been expanded outward to fill the voids in chamber 140.

The embodiment of FIG. 11 and 12 is similar to the other embodiments except in the embodiment of FIGS. 11 and 12 the electrical connection between the wire leads is formed by deforming the outer housing to crimp the deformable non-resilient collar 123 to leads 131 and 133. End cap 74 functions to retain the sealant in connector 120 during storage or during use of connector 120.

While the embodiments shown have been pre-filled with a sealant, one could also inject sealant into the compartment formed by the end cap and the wire connector. For example, a flexible tube dispenser could be used to inject sealant around the junction of the wire leads in the wire connector.

In certain applications one may not need an end cap to hold the sealant in place. For example, if the sealant sets upon ageing the sealant itself could form its own cap.

We claim:

1. A waterproof and fire retardant connector to permit a user to simultaneously form a waterproof, spark inhibiting, low resistance electrical connection between electrical leads comprising:

a housing, said housing having an electrical lead engaging surface and a threaded surface for engaging an end cap;

said housing operable to permit a user to rotate said wire connector about the twisted ends of electrical leads to provide a low resistance electrical connection between the electrical leads;

an end cap having a threaded surface for engaging said threaded surface of said housing, said end cap threadingly engaging said housing to provide a compartment in said housing for a sealant; and a water resistant and spark inhibiting sealant located inside said housing so that a user can simultaneously form a waterproof, spark inhibiting, low resistance electrical connection between the electrical leads by twisting said housing about the end of the electrical leads.

2. A twist-on wire connector for simultaneously encapsulating and securing the end of an electrical wire in a moisture-proof relationship within the wire connector comprising:

a housing, said housing having a closed end and an open end, said housing including an exterior surface for a user to grasp, said housing including an interior surface, said interior surface forming a compartment therein for receiving a sealant for encapsulating and moisture-proofing the end of an electrical wire;

a wire engaging member located on at least a portion of said interior surface of said housing; said wire engaging member having a tapered thread-like projection extending into said compartment for gripping and securing an electrical wire therein when an electrical wire is twisted into engagement with said wire engaging member; and a sealant located in said compartment of said housing, said sealant filling a portion of said compartment and covering at least a portion of said wire engaging member located in said housing, said compartment containing sufficient sealant so that when an end of an electrical wire having an insulating covering is inserted into the open end of the housing and into the sealant in said compartment one can cover the end of the electrical wire with sealant so that when the electrical wire is held with one hand and the housing is held with the other hand the user can twist the housing with the tapered thread-like projections about the sealant covered end of the electrical wire to form a mechanical connection between the wire engaging member and the sealant covered end of the electrical wire to hold the electrical wire in the wire engaging member while at the same time forming a moisture proof covering encapsulating the end of the electrical wire with said sealant extending onto the insulating covering on the electrical wire to thereby encapsulate the end of the electrical wire in the sealant in said compartment of said housing to prevent moisture from contacting the end of the electrical wire located in the sealant with said sealant being sufficiently viscous to maintain sealant properties while allowing said sealant to flow around and encapsulate the end of the electrical wire even if the electrical wire is mechanically disengaged and reengaged with the wire engagement member.

3. The twist-on wire connector of claim 2 including a puncturable cap located on said housing, said puncturable cap penetrable by an electrical wire to permit a user to insert an electrical wire into said wire engaging member and said sealant by forcing the electrical wire through said puncturable cap.

4. The twist-on wire connector of claim 2 including a plurality of insulation covered electrical wires forming an electrical and mechanical connection between the wire engaging member and the ends of the plurality of insulation covered electrical wires.

5. The twist-on wire connector of claim 2 including an end cap having a threaded surface for engaging said interior surface of said housing, said end cap threadingly engaging said housing so that said interior surface and said end cap coact to provide a closed compartment in said housing for a sealant.

6. The twist-on wire connector of claim 5 wherein said end cap conforms to the shape of the electrical wires inserted into said twist-on wire connector to prevent said sealant from flowing out of said twist-on wire connector.

7. The twist-on wire connector of claim 2 including:
an end cap, said end cap having an outer annular support ring for engaging said interior surface of said housing with said end cap including a plurality of resilient flexible segments located in said end cap, said resilient flexible segments forming an overlapping engagement to provide a closure over said interior region of said end cap to retain a sealant in said end cap.

8. A moisture proof connector to permit a user to simultaneously form a moisture-proof connection on the ends of a plurality of electrical leads, said connector comprising:
a housing having a closed end and another end;

an electrical conducting collar located in the closed end of the housing to permit a user to rotate the housing and collar as a unit about the ends of electrical leads extending into the housing through the other end thereof and into contact with said collar thereby providing an electrical connection with the collar and the electrical leads;

a closure member located at the other end of said housing, said closure member being penetrable by the ends of the electrical leads upon insertion of the leads through the other end of the housing and into contact with said collar; and a sealant in the housing, said sealant located in said closed end of said housing so that a user can simultaneously form a moisture-proof electrical connection with the electrical leads and the collar upon insertion of the ends of the electrical leads through the closure member and into the sealant and into contact with said collar by grasping and holding the electrical leads with one hand while rotating said housing and collar as a unit about the electrical leads located in said housing with the other hand to thereby simultaneously form an electrical connection with the sealant located around said electrical leads, said closure member resisting the escape of sealant from the housing upon insertion of the ends of the leads into the housing and formation of the electrical connection to encapsulate the ends of the electrical leads and collar in the sealant with said sealant being sufficiently viscous to maintain sealant properties while allowing said sealant to flow around and encapsulate the electrical leads even if the electrical leads are mechanically and electrically disengaged and reengaged with the electrical conducting collar.

9. A twist-on wire connector for encapsulating, electrically connecting and mechanically securing together insulatively-stripped ends of electrical wires in a water resistant and fire retardant relationship within the wire connector comprising:
a housing, said housing having a closed end and an open end, said housing including an exterior surface for a user to grasp and an interior surface, said interior surface forming a compartment therein;

wire engaging means located in said compartment, said wire engaging means having a thread-like projection for gripping the ends of insulatively-stripped electrical wires inserted into said compartment through said open end and securing said ends together mechanically and electrically when a user grasps the housing exterior surface and twists the housing while holding the wires firm; and a viscous sealant located in said compartment of said housing, said sealant maintaining sealing properties while being sufficiently viscous to thereby allow mechanical and electrical disengagement and reengagement of the ends of the insulatively-stripped electrical wires with said wire engaging means, said sealant filling a portion of said compartment for encapsulating the ends of the electrical wires to prevent moisture from reaching said ends of the electrical wires after the ends of the electrical wires have been secured together in said wire engaging means by twisting the sealant containing connector housing about the sealant covered ends of insulatively-stripped electrical wires to simultaneously form the sealant covered ends of the electrical wires into a mechanical connection, a waterproof connection, and a fire retardant connection.

10. The method of first forming a waterproof mechanical connection to the sealant covered ends of electrical wires comprising the steps of:

placing the ends of electrical wires proximate one another;

inserting the ends of electrical wires into a twist-on wire connector having a compartment with an interior surface having thread-like projections and a viscous sealant for maintaining sealing properties located in the compartment until the ends of electrical wires engage the viscous sealant and continuing the insertion of the ends of electrical wires into the viscous sealant until the ends of the electrical wires are mechanically engaging or reengaging the thread-like projections and the ends of electrical wires are encapsulated by the sealant; and then twisting the twist-on wire connector while holding the wires so that the sealant covered ends of electrical wires are simultaneously forced into a sealant covered mechanical connection with the twist-on wire connector while the sealant covered ends of electrical wires remain surrounded by the sealant to thereby form a waterproof covering around the sealant covered ends of the electrical wires located in a low resistance electrical connection in the twist-on wire connector.

11. The method of claim 10 including the step of inserting the ends of electrical wires through a cover with flexible segments before inserting ends of electrical wires into the sealant.

12. The method of claim 11 including the step of holding the twist-on wire connector in one hand and the electrical wires in the other hand.

* * * * *

REEXAMINATION CERTIFICATE (2894th)
United States Patent [19]
King, Jr. et al.

[11] B1 5,113,037
[45] Certificate Issued  * May 28, 1996

[54] WATERPROOF WIRE CONNECTOR

[75] Inventors: Lloyd H. King, Jr., Town & Country; Thomas A. King, Chesterfield, both of Mo.

[73] Assignee: King Technology of Missouri, Inc., St. Louis, Mo.

Reexamination Request:
No. 90/003,830, May 12, 1995

Reexamination Certificate for:
| | |
|---|---|
| Patent No.: | 5,113,037 |
| Issued: | May 12, 1992 |
| Appl. No.: | 574,808 |
| Filed: | Aug. 30, 1990 |

[*] Notice: The portion of the term of this patent subsequent to Jun. 11, 2008, has been disclaimed.

Related U.S. Application Data

[63] Continuation-in-part of Ser. No. 450,156, Dec. 13, 1989, abandoned, and a continuation-in-part of Ser. No. 478,687, Feb. 12, 1990, Pat. No. 5,023,402.

[51] Int. Cl.⁶ .................... H01R 4/22; H01R 43/00
[52] U.S. Cl. ................ 174/87; 29/872; 439/447; 439/449; 439/456

[56] References Cited

U.S. PATENT DOCUMENTS

| | | | |
|---|---|---|---|
| Re. 34,522 | 12/1994 | Wallace | 427/50 |
| D. 315,139 | 4/1991 | Blaha | D13/150 |
| D. 315,143 | 4/1991 | Blaha | D13/150 |
| D. 321,861 | 7/1991 | Wennemar et al. | D13/150 |
| 2,199,532 | 8/1940 | Weeks | 171/326 |
| 2,772,323 | 1/1956 | Smith | 174/87 |
| 2,862,616 | 12/1958 | Cappozzi et al. | 206/219 |
| 2,939,805 | 4/1960 | Johnson | 117/75 |
| 3,061,455 | 7/1962 | Anthony | 117/37 |
| 3,087,606 | 6/1963 | Bollmeier et al. | 206/47 |
| 3,306,330 | 6/1967 | Wallace | 151/7 |
| 3,378,912 | 4/1968 | Wallace | 29/419 |
| 3,385,922 | 3/1968 | Rice | 174/84 |
| 3,418,840 | 8/1968 | Wallace | 73/1 |
| 3,478,800 | 2/1969 | Wallace | 151/7 |
| 3,530,704 | 11/1970 | Wallace | 73/1 |
| 3,716,653 | 6/1973 | Willmarth | 174/87 |
| 3,746,068 | 9/1973 | Deckert et al. | 151/14.5 |
| 3,893,496 | 2/1975 | Wallace et al. | 151/14.5 |
| 3,950,579 | 4/1976 | Wallace | 427/379 |
| 3,985,951 | 3/1976 | Harris | 174/138 F |
| 4,059,136 | 2/1977 | Wallace | 151/14.5 |
| 4,081,012 | 7/1978 | Wallace | 151/14.5 |
| 4,081,062 | 8/1978 | Wallace | 151/14.5 |
| 4,220,811 | 3/1980 | Scott | 174/87 |
| 4,227,040 | 5/1980 | Scott | 174/87 |
| 4,241,878 | 10/1980 | Underwood | 239/591 |
| 4,262,038 | 3/1981 | Wallace | 427/181 |
| 4,268,544 | 7/1981 | Wallace | 427/264 |
| 4,279,943 | 10/1981 | Wallace | 427/57 |
| 4,285,378 | 11/1981 | Wallace | 411/258 |
| 4,321,885 | 4/1982 | Wallace | 118/102 |
| 4,325,985 | 6/1982 | Wallace | 427/54.1 |
| 4,350,841 | 2/1982 | Scott | 174/87 |
| 4,399,166 | 1/1983 | Wallace | 427/195 |
| 4,420,604 | 4/1983 | Wallace | 528/93 |
| 4,428,981 | 2/1984 | Wallace | 427/195 |
| 4,428,982 | 2/1984 | Wallace | 427/202 |
| 4,501,041 | 4/1985 | Wallace | 10/86 A |
| 4,508,759 | 5/1985 | Wallace | 427/195 |
| 4,531,016 | 7/1985 | Dove | 174/87 |

(List continued on next page.)

*Primary Examiner*—Morris H. Nimmo

[57] ABSTRACT

A waterproof and fire retardant connector having a rotatable wire connector with an end cap attached thereto with the wire connector filled with a sealant to permit the user to simultaneously compress the junctions ends of electrical wires into low resistance electrical contact while forming a waterproof covering and spark inhibiting compound surrounding the twisted junction end of the wires. The process includes inserting the junction ends of electrical leads into a wire connector, which is filled with a waterproof and fire retardant sealant, and then either crimping or rotating the wire connector to simultaneously form an electrical connection and waterproof and spark inhibiting seal around the twisted junction ends of the wires.

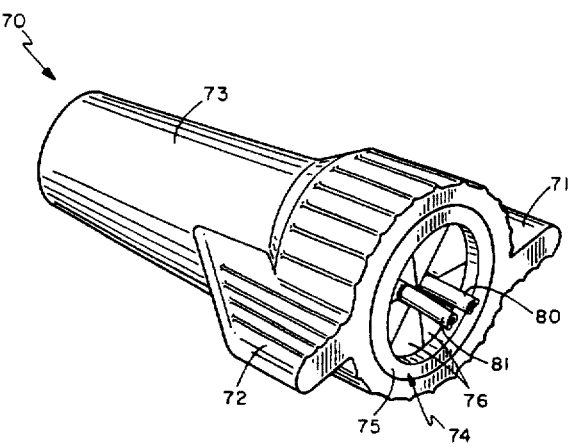

U.S. PATENT DOCUMENTS

| | | | |
|---|---|---|---|
| 4,545,712 | 10/1985 | Wallace | 411/258 |
| 4,686,272 | 4/1987 | Wallace | 528/87 |
| 4,691,079 | 12/1987 | Blaha | 174/87 |
| 4,707,567 | 6/1987 | Blaha | 174/87 |
| 4,721,832 | 7/1988 | Toy | 174/87 |
| 4,764,579 | 11/1988 | Wallace | 528/87 |
| 4,803,779 | 3/1989 | Blaha | 29/878 |
| 4,824,395 | 6/1989 | Blaha | 439/438 |
| 4,847,113 | 8/1989 | Wallace | 427/54.1 |
| 4,881,322 | 8/1989 | Finn et al. | 29/878 |
| 5,023,402 | 6/1991 | King, Jr. et al. | 174/87 |
| 5,315,066 | 5/1994 | Spiteri, Sr. | 174/87 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–12 is confirmed.

Claim 1 is determined to be patentable as amended.

1. A waterproof and fire retardant connector to permit a user to simultaneously form a waterproof, spark inhibiting, low resistance electrical connection between electrical leads comprising:

a housing, said housing having an electrical lead engaging surface and a threaded surface for engaging an end cap;

said housing operable to permit a user to rotate said wire connector about the twisted ends of electrical leads to provide a low resistance electrical connection between the electrical leads;

an end cap having a threaded surface for engaging said threaded surface of said housing, said end cap threadingly engaging said housing to provide a compartment in said housing for a sealant; and a water resistant and spark inhibiting sealant located inside said housing so that a user can simultaneously form a waterproof, spark inhibiting, low resistant electrical connection between the electrical leads by twisting said housing about the end of the electrical leads *with said sealant continually maintaining sealant properties while allowing said sealant to flow around and encapsulate the end of the electrical leads even if the electrical leads are mechanically disengaged and reengaged with the lead engaging surface at a later time.*

* * * * *